July 21, 1959
G. W. GODDARD
2,895,393
AUTOMATIC AERIAL PHOTOGRAPHY SYSTEM
Filed Feb. 9, 1956
2 Sheets-Sheet 1
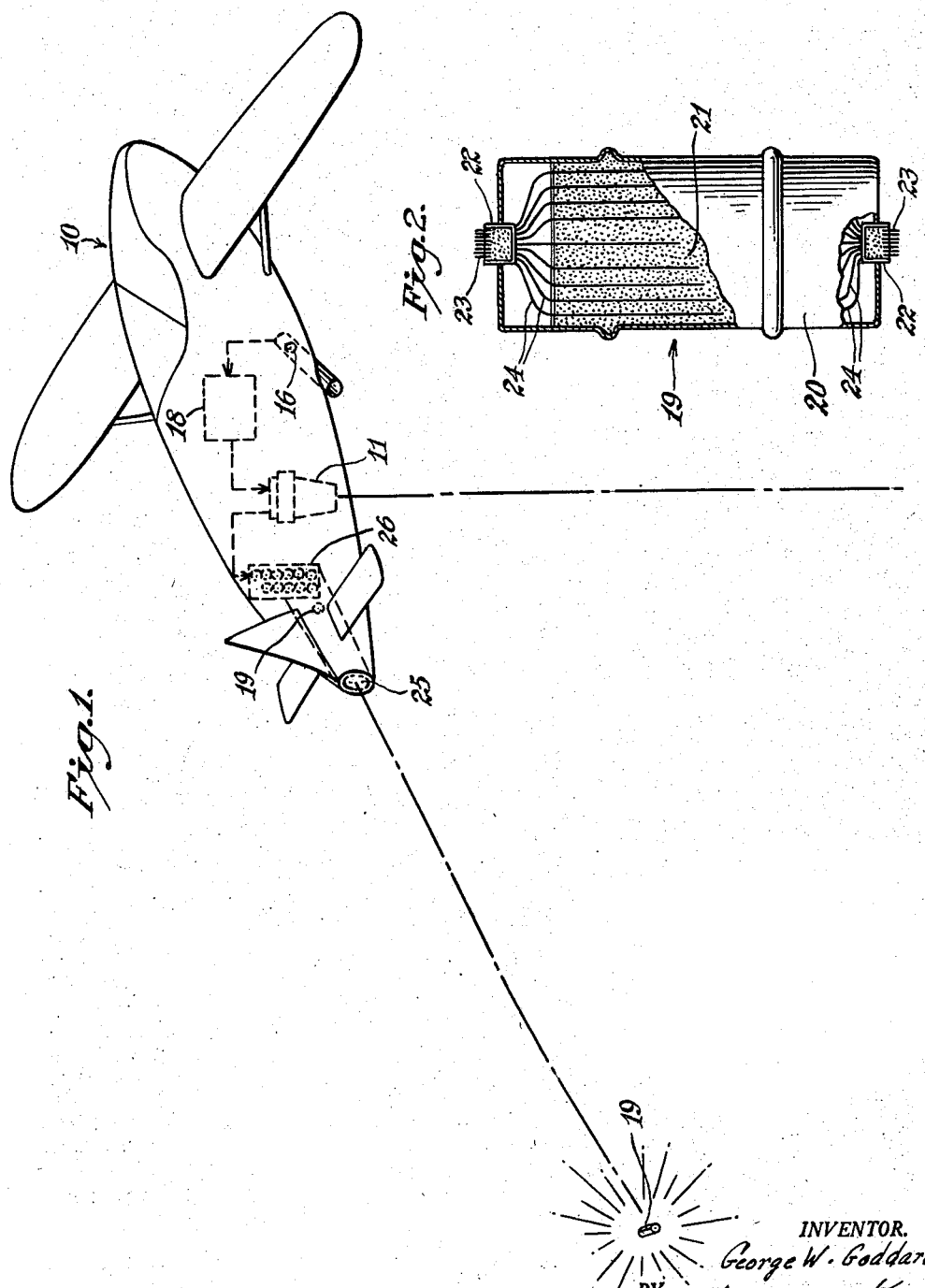
INVENTOR.
George W. Goddard
BY
Kenyon and Kenyon
ATTORNEYS.

July 21, 1959
G. W. GODDARD
2,895,393
AUTOMATIC AERIAL PHOTOGRAPHY SYSTEM
Filed Feb. 9, 1956
2 Sheets-Sheet 2
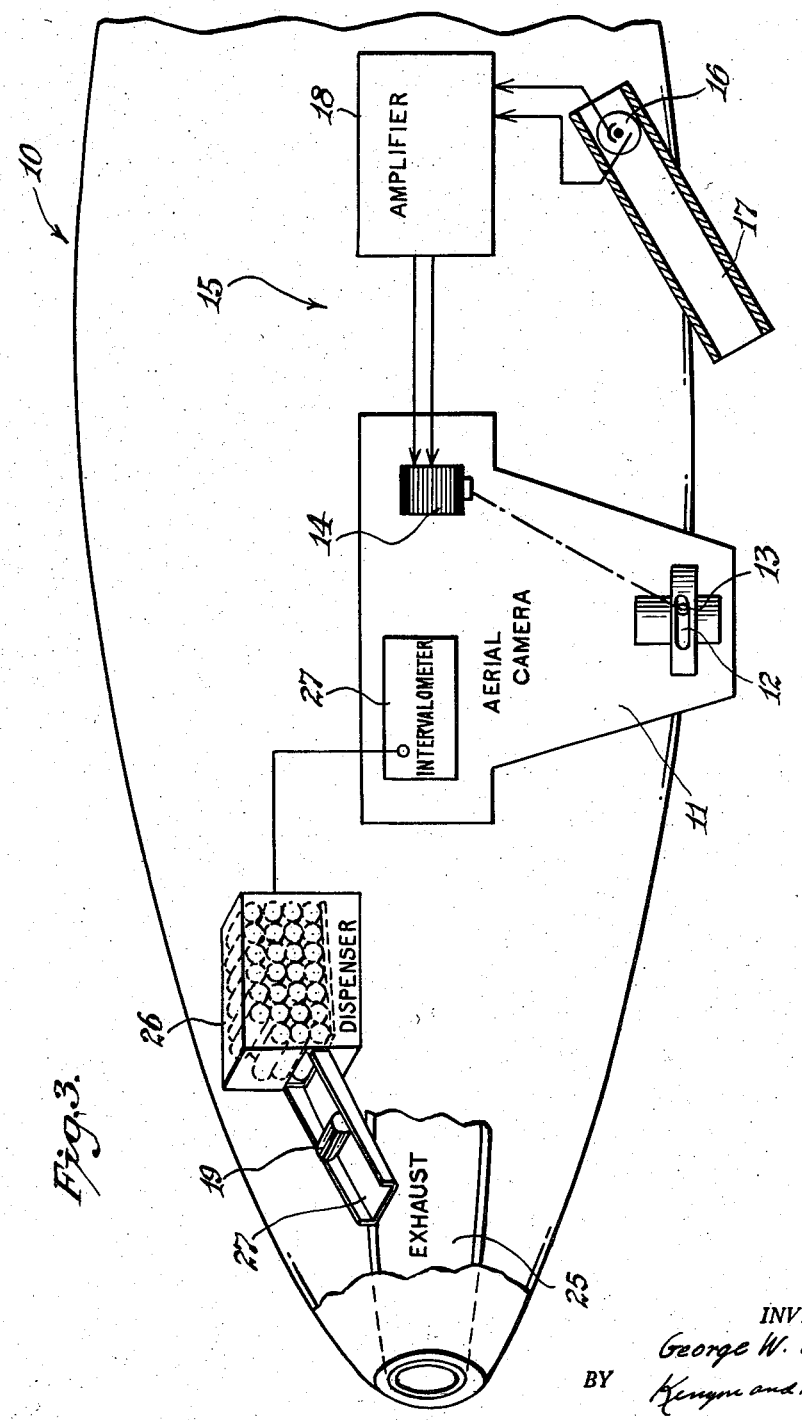
INVENTOR.
George W. Goddard
BY
Kenyon and Kenyon
ATTORNEYS.

2,895,393

AUTOMATIC AERIAL PHOTOGRAPHY SYSTEM

George W. Goddard, Chevy Chase, Md., assignor to Bulova Research and Development Laboratories, Inc., Woodside, N.Y., a corporation of New York Application February 9, 1956, Serial No. 564,535

4 Claims. (Cl. 95—12.5)

The present invention relates generally to aerial photography and more particularly to techniques and apparatus for automatically taking aerial photographs under conditions requiring artificial illumination. The invention is applicable not only to pilot-operated reconnaissance planes or missiles, but also to remote-controlled or pilotless aircraft.

Aerial night photography entails the use of brilliant flashes for the effective illumination of the terrain being photographed. For this purpose it has heretofore been the practice to eject a flashlight explosive bomb from the rear of the plane and to provide a camera having a shutter mechanism which is actuated by a light-sensitive cell responsive to the light emitted from the flashlight. Thus the instant the bomb explodes, the shutter is caused to open for a brief interval and the photograph is taken at the point of maximum illumination. For a more detailed description of such systems, reference is made to the earlier patent to Goddard 1,936,595.

In aerial reconnaissance operations for the purpose of photographing military ground equipment and personnel, the conventional photographic system has certain drawbacks. To facilitate the identification of objects projecting upwardly from the ground, it is desirable that the angle of illumination be such as to produce distinct and relatively long shadows. Obviously, where the source of illumination is in close proximity to the camera, then little shadow will appear in the photograph and difficulty will be experienced in distinguishing objects therein. In the conventional aerial photographic system, the camera is trained downwardly on the area directly beneath the plane, whereas the flare is expelled from the plane to explode at a point to the rear of the plane. However, since little if any force is used to expel the flare cartridge, the point of explosion is relatively close to the plane and long shadows are not developed in the photograph.

It is desirable for effective reconnaissance photography that the flare explosion take place well to the rear of the plane but at the same time it is important that the altitude of the explosion be not too far below that of the plane. In this way the illuminating rays will be properly distributed over the region being photographed and the angle of illumination will be sufficiently oblique to produce long shadows. This optimum relationship between the position of the flare with respect to the plane and the terrain cannot be attained with known systems, particularly when the plane is flying at low altitudes.

Accordingly, it is the principal object of the invention to provide an aerial photographic system in which a flash powder cartridge receives sufficient rearward propulsion to place the flash far enough rearwards of the vehicle to produce long shadows in the photograph.

More particularly, it is an object of the invention to provide a system of the above type wherein the exhaust of a jet or rocket propelled missile acts to ignite and to project a flash powder cartridge rearwardly at a high velocity.

Also, an object of my invention is to provide a flash powder cartridge having igniter means adapted to operate when the cartridge is thrust into the flame exhaust of a plane, the igniter being tied to a powder mass by a fuse whereby the cartridge is caused to explode after a predetermined interval.

Still another object of the invention is to provide a flash cartridge dispensing and ignition system synchronized with single or multi-camera operation at high speed.

Briefly stated, in a reconnaissance system for night photography in accordance with the invention, the vehicle employed is of the conventional jet or rocket type in which the fuel gases are expelled from an exhaust at the rear of the vehicle. Each vehicle carries a considerable number of flash cartridges depending upon the size of the vehicle and the number of aerial photographs to be taken. The cartridges, made in any shape or size, are ejected from a dispenser down a chute into the flame of the engine exhaust position. The rate at which the cartridges are dropped into the flame may be predetermined in accordance with the speed of the vehicle, the altitude and amount of overlap desired in the strip of aerial photographs. Each cartridge includes a multiple of flame igniters and fuses on each side of the cartridge to insure immediate ignition on contact with the flame. At this instant, the cartridge is subjected to a propulsive force ejecting it rearwardly. The cartridge is exploded at a distance in the rear of the vehicle determined by the fuse burning time, the resultant flash being far enough rearward to produce long shadows in the photograph.

For a better understanding of the invention as well as other objects and further features thereof, reference is had to the following detailed description to be read in conjunction with the accompanying drawing, wherein like components in the various views are identified by like reference numerals.

In the drawing:

Figure 1 is a diagrammatic view of an automatic aerial photographic system in accordance with the invention installed in a plane drone or missile.

Figure 2 is a separate view of the flashlight cartridge.

Figure 3 is a schematic view of the camera and control apparatus as well as the cartridge dispenser.

Referring now to the drawing and more particularly to Figs. 1 and 3, a typical jet or rocket propelled plane is designated by the numeral 10. An aerial camera 11 is mounted in the fuselage of the plane and is oriented to take vertical photographs of the terrain lying below the plane. The camera may be of a type adapted to take strip pictures and includes a shutter mechanism 12 which may be of any standard design actuated by a lever 13. Mechanically coupled to lever 13 is an electromagnetic device 14 which when energized acts to actuate the lever, thereby operating the shutter.

An electronic control circuit 15 functions to control device 14, the circuit including a photocell 16. Cell 16 is preferably mounted at the end of a tubular shield 17 projecting from the fuselage of the plane at an angle such that the cell proper will be screened from light emanating from the aircraft and from the ground directly below the latter. Consequently, light will not impinge on the photocell 16 unless the source thereof is located well to the rear of the plane and in line with the shield. This will insure against accidental operation of the camera shutter by light coming from sources other than the flare.

Photocell 16 is connected to the input of an amplifier 18 of any suitable design, the output of the amplifier being connected to the electromagnetic device 14. In operation, the camera 11 normally has its shutter closed and set for instantaneous exposure at the appropriate moment. A flash cartridge 19 is released astern and after a predetermined interval determined by the fuse characteristics, the cartridge explodes to illuminate the terrain. Light from the exploding flare is detected by the photocell to produce a voltage which when amplified has a magnitude sufficient to energize electromagnetic device 14, thereby operating the shutter so as to make an instantaneous exposure of the film in the camera. The control circuit is preferably adjusted with respect to the light intensity curve of the flash so as to operate the shutter only when the illumination attains its peak intensity.

Cartridge 19, as shown separately in Fig. 2, is made in any size or shape, and includes a frangible casing 20 which contains a mass or charge of flash powder 21 which may be of a standard Air Force high efficiency type. The charge 21 is adapted to burst the casing when exploded and to produce a brilliant light suitable for photographic illumination from the air. To set off the charge there is provided at either end of the casing an igniter 22 in the form of a container of black powder. Projecting externally from the igniters are a plurality of fuse hairs 23 which when exposed to flame flare up immediately to set off the igniter. The burning of the igniter powder in turn ignites the ends of a plurality of fuse trains 24 which branch out from the igniters and extend through the entire mass of powder 21. The length and burning rate of the fuses should be such that the cartridge will be at the desired distance in the rear of the plane before the flash explosion takes place.

The cartridges 19 are fed at regulated intervals into the exhaust tube 25 of the plane, the exhaust being connected in the usual manner to the combustion chamber of the engine. The cartridges are ejected from a magazine or mechanical dispenser 26 down a chute 27 which leads into the exhaust. The rate at which the cartridges are dropped into the exhaust flame can be incorporated into the cartridge dispensing mechanism. The release of the cartridges may be accomplished by means of a time-controlled mechanism synchronized with the standard camera intervalometer 27. The rate of cartridge release is made to depend upon the speed of the vehicle, its altitude and the amount of overlap desired in the strip of aerial photographs. In lieu of a dispenser for the cartridges, a belt conveyer may be employed to drop the cartridges into the exhaust.

When the cartridge drops into the exhaust, the hairs 23 catch fire in the flame, setting off the igniter 22 and igniting the ends of fuse trains 24. At the same time, the cartridge receives rearward propulsion from the gases in the exhaust. The cartridge is hurled with great force to a distance rearward of the vehicle and thereafter the flash powder is exploded to illuminate the terrain. The position of the cartridge at the instant of explosion is sufficiently rearward to produce long shadows in the photographs of military ground installations.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. In a jet or rocket propelled missile provided with rear exhaust tubes through which propulsive gases are emitted, an aerial photographic system comprising a camera having an exposure shutter, means to drop a flash-powder cartridge into said exhaust to cause rearward propulsion thereof, said cartridge having fuse means ignited by said gases to effect an explosion of the flash powder at a point sufficiently rearward of the missile to produce long shadows, and means responsive to the illumination of said flash powder to actuate said shutter.

2. An aerial photographic system for a jet or rocket plane having an exhaust tube, said system comprising a camera positioned in the fuselage of the plane and directed to photograph the terrain beneath the plane, said camera including a shutter mechanism, a light-responsive electronic control system coupled to said shutter mechanism for actuating same, and means to release a flash-powder cartridge into the exhaust, whereby the cartridge is projected rearwardly of the plane, said cartridge having fuse means ignited by said exhaust to produce a delayed explosion effecting response of said electronic control system to operate said shutter.

3. An aerial photographic system for a jet or rocket plane having an exhaust tube, said system comprising a camera positioned in the fuselage of the plane and oriented to photograph the terrain beneath the plane, said camera including a shutter mechanism and an intervalometer, a cartridge dispenser containing a plurality of flash-powder cartridges and means to release same into said exhaust, said cartridges each having fuse means ignited by said exhaust to cause an explosion at a point rearwardly of the plane, and means coupling said dispenser to said intervalometer to regulate the release of said cartridges.

4. In a jet or rocket propelled missile provided with rear exhaust tubes through which propulsive gases are emitted, an aerial photographic system comprising a camera having an exposure shutter, means to drop a flash-powder cartridge into said exhaust to cause rearward propulsion thereof, said cartridge having fuse means ignited by said gases to effect an explosion thereof at a point sufficiently rearward of the missle to produce long shadows, and means responsive to the illumination of said flash powder to actuate said shutter, said illumination response means including a photocell oriented to intercept light radiation from the explosion, an amplifier coupled to said photocell, and an electromagnetic device coupled to the output of the amplifier and linked to said shutter to actuate same.

References Cited in the file of this patent

UNITED STATES PATENTS

| | | |
|---|---|---|
| 383,984 | Piffard | June 5, 1888 |
| 1,754,987 | Driggs et al. | Apr. 15, 1930 |
| 1,936,595 | Goddard | Nov. 28, 1933 |
| 2,381,130 | Lloyd | Aug. 7, 1945 |
| 2,399,476 | Doyle et al. | Apr. 30, 1946 |
| 2,714,999 | Thieblot et al. | Aug. 9, 1955 |

FOREIGN PATENTS

| | | |
|---|---|---|
| 486,946 | Italy | Nov. 19, 1955 |